May 31, 1927.

H. A. TRAVERS 1,630,363

TRANSFORMER TAP CHANGING DEVICE

Filed June 16, 1926

WITNESSES:

INVENTOR
Henry A. Tra
BY
ATTORN

Patented May 31, 1927.

1,630,363

UNITED STATES PATENT OFFICE.

HENRY A. TRAVERS, OF FOREST HILLS, PENNSYLVANIA, ASSIGNOR TO WESTINGHOUSE ELECTRIC & MANUFACTURING COMPANY, A CORPORATION OF PENNSYLVANIA.

TRANSFORMER-TAP-CHANGING DEVICE.

Application filed June 16, 1926. Serial No. 116,314.

My invention relates to transformer-tap-changing apparatus and particularly to relay systems for protecting such transformers.

One object of my invention is to provide a protective system for an electrical transformer and tap-changing apparatus that shall protect the apparatus from conditions of short circuit within the transformer winding.

Another object of my invention is to provide a differential protective system for electric transformers and tap-changing apparatus that shall be controlled in accordance with the operation of the tap-changing apparatus.

Another object of my invention is to provide a protective system for electrical transformers and tap-changing apparatus that comprises an auto-transformer, the connections of which shall be controlled in accordance with the operation of the tap-changing apparatus.

An electrical transformer is sometimes provided with a differential relay system connecting the primary and secondary circuits for the purpose of disconnecting it from its supply circuit in the event that the ratio between its input and output becomes of a magnitude that indicates a condition of a short-circuit between the turns of its winding or a fault to ground. When a transformer having the above specified equipment is equipped also with tap-changing apparatus for varying the voltage ratio between the primary and secondary windings, it becomes necessary to provide means for varying the connections of the relay system in order that such system shall continue to indicate the true ratio between the transformer input and the output.

I accomplish the desired result by providing an auto-transformer in the relay circuit, one winding of which is energized from the primary circuit of the main transformer and the other winding of which is energized from the secondary winding of the main transformer, three suitable current transformers of fixed ratio, and varying the connections of the auto-transformer in accordance with the changes in the voltage ratio of the main transformer.

Figure 1:
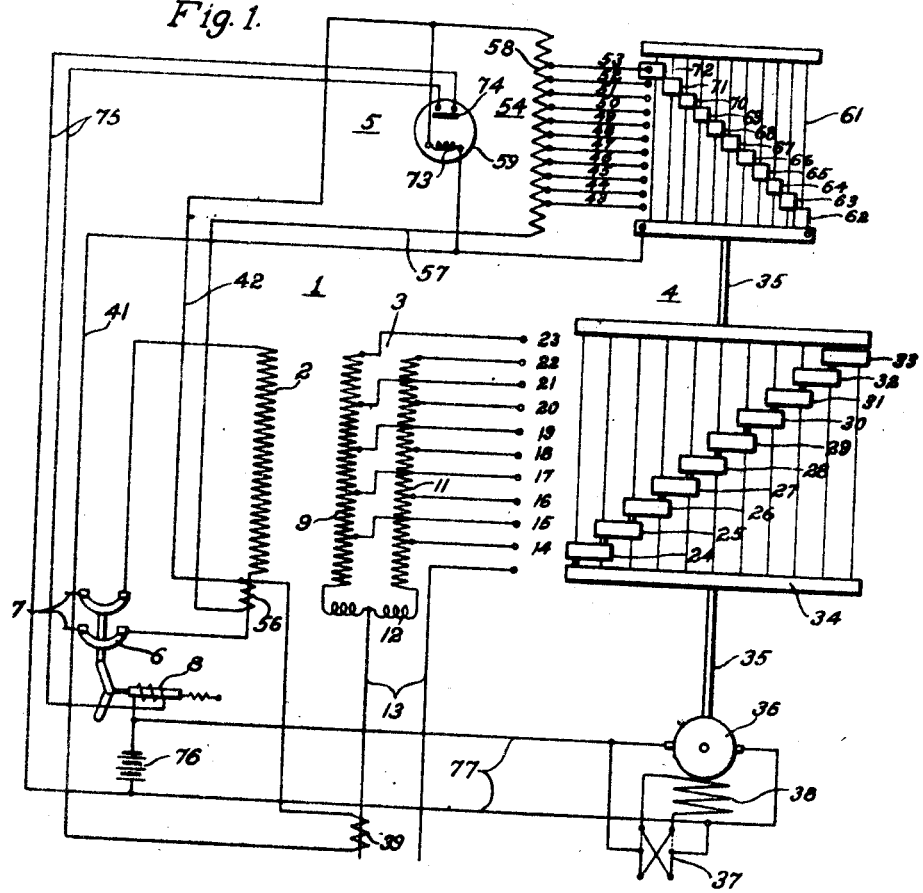
Figure 2:
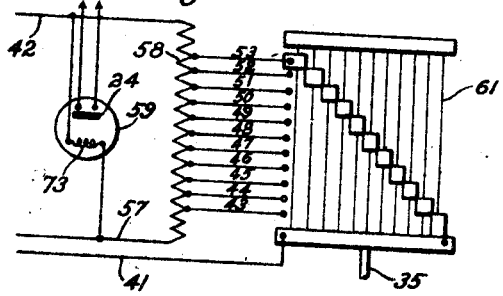

In the accompanying drawings,

Figure 1 is a diagrammatic view of circuits and apparatus embodying my invention; and Fig. 2 is a fragmentary view of a modified form of my invention.

My invention comprises, in general, a main transformer 1 having the usual primary winding 2, a secondary winding 3 and a tap-changing device 4, together with a relay protective system 5, embodying the details of my invention.

The primary winding 2 of the main transformer 1 is connected, through a circuit interrupter 6, to a supply circuit 7. The circuit interrupter 6 is provided with the usual tripping coil 8.

The secondary winding 3 comprises a pair of parallel windings 9 and 11 that are connected, through an auto-balance transformer 12 and the tap-changing device 4, to a secondary circuit 13. The windings 9 and 11 are provided with a plurality of taps 14 to 23 that cooperate with contact segments 24 to 33 mounted on a drum 34 of the tap-changing device 4. The even numbered taps and contact segments cooperate with the winding 11, and the odd numbered tap connections and contact segments cooperate with the winding 9. The drum 34 is connected, by a shaft 35, to a motor 36 having a reversing switch 37 connected to its field winding 38. For controlling the direction of rotation of the motor 36, the reversing switch 37 may be either manually or automatically actuated by suitable circuits and apparatus which are not shown because they constitute no part of the present invention.

The protective device 5 comprises a current transformer 39, inductively related to one of the conductors of the secondary circuit 13, and connected by conductors 41 and 42 to the several taps 43 to 53 of an auto-transformer 54, whereby the current transformer 39 is in the secondary circuit thereof. A second current transformer 56 is connected, by the conductor 42 and a conductor 57 to the primary winding 58 of the auto-transformer 54.

While an auto-transformer does not have separate primary and secondary windings, it is customary practice to refer to the circuit including the entire winding as the primary circuit and to the circuit including a portion of the winding as the secondary circuit. Accordingly, the entire winding is hereinafter called the primary winding and that portion of the winding included in both circuits is called the secondary winding. A relay 59 is connected between the conductors 41 and 42 in parallel circuit to the auto-transformer 54, across its secondary winding.

A drum 61, having contact segments 62 to 72 is mounted on an extension of the shaft 35 to cooperate with the transformer taps 43 to 53, respectively.

The relay 59 may be of any desired type that operates when subjected to a predetermined current for a definite interval of time and comprises a winding 73 and a contact-making device 74. The contact-making device 74 is connected by conductors 75, to a battery 76 and the tripping coil 8 of the circuit interrupter 6. The battery 75 is also connected, by conductors 77, to the motor 36.

Assuming the tap-changing device 4 to be in such position that the taps 14 and 15 are in engagement with the contact segments 24 and 25, respectively, the main secondary circuit 13 is completed through the balance-coil 12 and the tap-changing device 4, at which time the contact segment 71 on the drum 61 is in engagement with the tap 52 of the auto-transformer 54. The primary winding 58 of the auto-transformer 54 is energized in accordance with the current traversing the main primary winding 2, while the secondary winding of the auto-transformer 54 includes all the windings above the tap 52. The main transformer 1 is now in its position of relatively low voltage and light secondary current, at which time the number of ampere-turns in the primary winding of the transformer 54 equals the number of ampere-turns in its secondary winding, with the result that the protective winding 5 is in a state of equilibrium and no current traverses the relay 59.

When it is desired to increase the secondary current of the main transformer 1, the motor 36 is energized to turn the shaft 35 in a counter-clockwise direction which causes the several contact segments 25 to 33 to engage the tap connections 15 to 23, respectively, in a manner well known in the art, and to increase the voltage and, consequently, the secondary circuit in the main transformer 1. However, the current traversing the primary winding 2 of the main transformer 1 does not increase as fast as the current traversing its secondary circuit 13. Accordingly, if the setting of the auto-transformer 54 were not changed, the influence of the current transformer 39 on the protective system would over-balance that of the primary-current transformer 56, with the result that the relay 59 would be operated to cause the circuit interrupter 6 to open, thereby deenergizing the main transformer 1.

In order to keep the influence of the current transformers 39 and 56 on the protective system 5 equal, it is necessary to so vary the tap connections 43 to 53 that, as the voltage of the secondary winding 3 of the transformer 1 is increased, the number of turns in the secondary circuit of the auto-transformer 54 is decreased, so that the number of ampere turns in the primary circuit of the auto-transformer 54 remains equal to the number of ampere-turns in its secondary circuit. This is accomplished by causing the drum 61 to successively move the contact segments 71 to 62 into engagement with the tap connections 52 to 43, respectively, in accordance with the movement of the drum 34 and the contact segment carried thereby.

Under normal operating conditions, the auto-transformer 54 remains in a state of balance or equilibrium, and the relay 59 remains deenergized. However, should a short-circuit occur between the turns of the primary winding 2 or secondary winding 3, an increase in the amount of the primary current traversing the circuit 7 would occur, while the current traversing the secondary circuit 13 would not increase proportionately. The result of such condition is to cause the current transformer 56 to induce an increased current in the primary winding 58 of the auto-transformer 54 that is not balanced by the number of ampere-turns in the secondary circuit. Accordingly, the relay 59 is energized to close its contact-making device 74, thereby actuating the tripping coil 8 to open the circuit interrupter 6.

When it is desired to reduce the secondary voltage of the transformer 1, the shaft 35 is turned in a clockwise direction, which causes the contact segments on the drums 34 and 61 to engage their cooperating tap connections in a reverse order. However, the number of ampere-turns in the primary circuit of the transformer 54 is always maintained equal to the number of secondary ampere-turns, provided that no short-circuit exists between the turns of the main primary and secondary windings 2 and 3, respectively.

Referring to Fig. 2, I have shown a modified form of my invention in which the relay 59 is connected between the conductors 42 and 57; that is, across the current transformer connected to the primary circuit of the transformer 1. This form of my invention is otherwise similar to that shown in Fig. 1.

It will thus be seen that I have provided a relay protective system for transformers having tap-changing apparatus connected thereto that is characterized by having auxiliary tap-changing means for controlling the connections of an auto-transformer, such that the ratio of its primary and secondary ampere-turns remains equal, regardless of changes in the ratio of the main primary and secondary currents of the protected transformer.

It is to be understood that such changes in the arrangement and connection of the component parts of my invention may be made as will be within the scope of the appended claims.

I claim as my invention:

1. The combination with a transformer comprising primary and secondary windings, means for varying the number of effective turns of one of the windings, and a relay system responsive to predetermined differences in the current traversing the primary and secondary windings, of means for regulating the relay system in accordance with the operation of the means for varying the winding.

2. The combination with a transformer comprising primary and secondary windings, means for varying the number of effective turns of one of the windings, and a relay system responsive to predetermined differences in the current traversing the primary and secondary windings, of means for controlling the influence of the currents traversing the primary and secondary windings upon the relay system in accordance with the operation of the means for varying the windings.

3. The combination with a transformer comprising primary and secondary windings, means for varying the number of effective turns of one of the windings, and a relay system responsive to predetermined differences in the current traversing the primary and secondary windings, of a contact making device for controlling the influence of the currents traversing the primary and secondary windings upon the relay system in accordance with the operation of the means for varying the winding.

4. The combination with a main transformer comprising primary and secondary windings, means for varying the number of effective turns of one of the windings, and a relay system comprising a second transformer and a relay responsive to predetermined differences in the current traversing the main primary and secondary windings, of means for controlling the influence of the currents traversing the main primary and secondary windings upon the relay by controlling the connections of the second transformer in accordance with the operation of the means for varying the winding.

5. The combination with a main transformer comprising primary and secondary windings, means for varying the number of effective turns of one of the windings, and a relay system comprising an auto-transformer and a relay responsive to predetermined differences in the current traversing the main primary and secondary windings, of means for controlling the influence of the currents traversing the main primary and secondary windings upon the relay by controlling the connections of the auto-transformer in accordance with the operation of the means for varying the winding.

6. The combination with a transformer comprising primary and secondary windings, means for varying the number of effective turns of one of the windings, and a relay system responsive to predetermined differences in the current traversing the primary and secondary windings, and comprising an auxiliary transformer, and current transformers connected to the primary and secondary windings of the auxiliary transformer, of means for controlling the influence of the currents traversing the first-named primary and secondary windings upon the relay system by controlling the connections of the auxiliary transformer in accordance with the operation of the means for varying one of the first-named windings.

7. The combination with a transformer comprising primary and secondary windings, means for varying the number of effective turns of one of the windings, and a relay system responsive to predetermined differences in the current traversing the primary and secondary windings, and comprising an auxiliary transformer and current transformers connected to both primary and secondary windings, respectively, of means for controlling the influence of the current traversing the first named primary and secondary windings upon the relay system by controlling the connections of the auxiliary transformer in accordance with the operation of the means for varying one of the first named windings.

8. The combination with a transformer comprising primary and secondary windings, means for varying the number of effective turns of one of the windings, and a relay system responsive to predetermined differences in the current traversing the primary and secondary windings, and comprising an auxiliary transformer and current transformers connected to both primary and secondary windings, respectively, of means for controlling the influence of the current traversing the first-named primary and secondary windings upon the relay system by varying the ratio between the primary and secondary windings of the auxiliary transformer in accordance with the operation of the means for varying one of the first-named windings.

In testimony whereof, I have hereunto subscribed my name this 2nd day of June, 1926.

HENRY A. TRAVERS.